(12) United States Patent
Walldorf et al.

(10) Patent No.: US 6,505,756 B1
(45) Date of Patent: Jan. 14, 2003

(54) DELIVERY DEVICE FOR SMALL PARTS AND TRANSPORTATION CHANNEL

(75) Inventors: Hugo Walldorf, Giessen (DE); Stefan Schneider, Ebsdorfergrund (DE)

(73) Assignee: Newfrey LLC, Newark, DE (US)

( * ) Notice: Subject to any disclaimer, the term of this patent is extended or adjusted under 35 U.S.C. 154(b) by 8 days.

(21) Appl. No.: 09/655,364

(22) Filed: Sep. 5, 2000

(30) Foreign Application Priority Data

Sep. 9, 1999 (DE) .......................................... 199 43 164

(51) Int. Cl.[7] .............................................. B65H 31/20
(52) U.S. Cl. ........................ 221/241; 221/254; 221/258
(58) Field of Search ................................. 221/241, 254, 221/258, 268, 270; 227/99, 107, 109, 135

(56) References Cited

U.S. PATENT DOCUMENTS

| 488,084 A | * 12/1892 | Miner |
| 3,148,373 A | * 9/1964 | Effgen |
| 5,702,030 A | * 12/1997 | Hulscher ..................... 221/254 |
| 6,039,209 A | * 3/2000 | Yuyama et al. ......... 221/254 X |

FOREIGN PATENT DOCUMENTS

| CH | 396763 | * 1/1966 |
| DE | 1226489 | * 10/1966 |
| EP | 0216203 A2 | * 4/1987 |
| FR | 2484377 | * 12/1981 |

* cited by examiner

Primary Examiner—David H. Bollinger
(74) Attorney, Agent, or Firm—Edward D. Murphy

(57) ABSTRACT

In a delivery device small parts (15) in the nature of studs, bushes, pins and suchlike are conducted by means of a perpendicularly displaceable strut (6) into a transportation channel (11) from a sloping collection area (1). The strut (6) slides along a retaining and dividing wall (3) and has an upper narrow side 6a which slopes obliquely downwards towards the retaining and dividing wall (3). Owing to the obliquely downwards directed slope of the upper narrow side (6a) the small parts (15) become reliably lodged on the retaining and dividing wall (3) when the strut (6) is located in its lower operating position (FIG. 2). In the upper operating position the small parts (15) slide obliquely downwards over the retaining and dividing wall (3) into the transportation channel (11). A metering plate (7) with projections and gaps, located on the strut (6) in its upper region, determines how many small parts (15) are to be conducted into the transportation channel (11) each time the strut (6) is lifted. The transportation channel (11) has a compound receiver profile, for example, a segment of a circle (13) starting from the upper side, out of which a rectangle (14) protrudes downwards. In this way small parts with a compound outer cross-section slide particularly smoothly in the transportation channel.

22 Claims, 3 Drawing Sheets

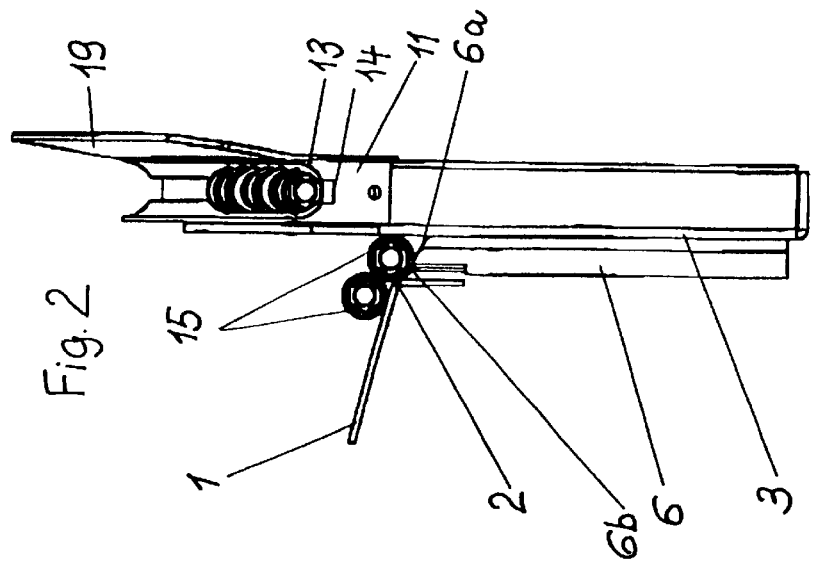
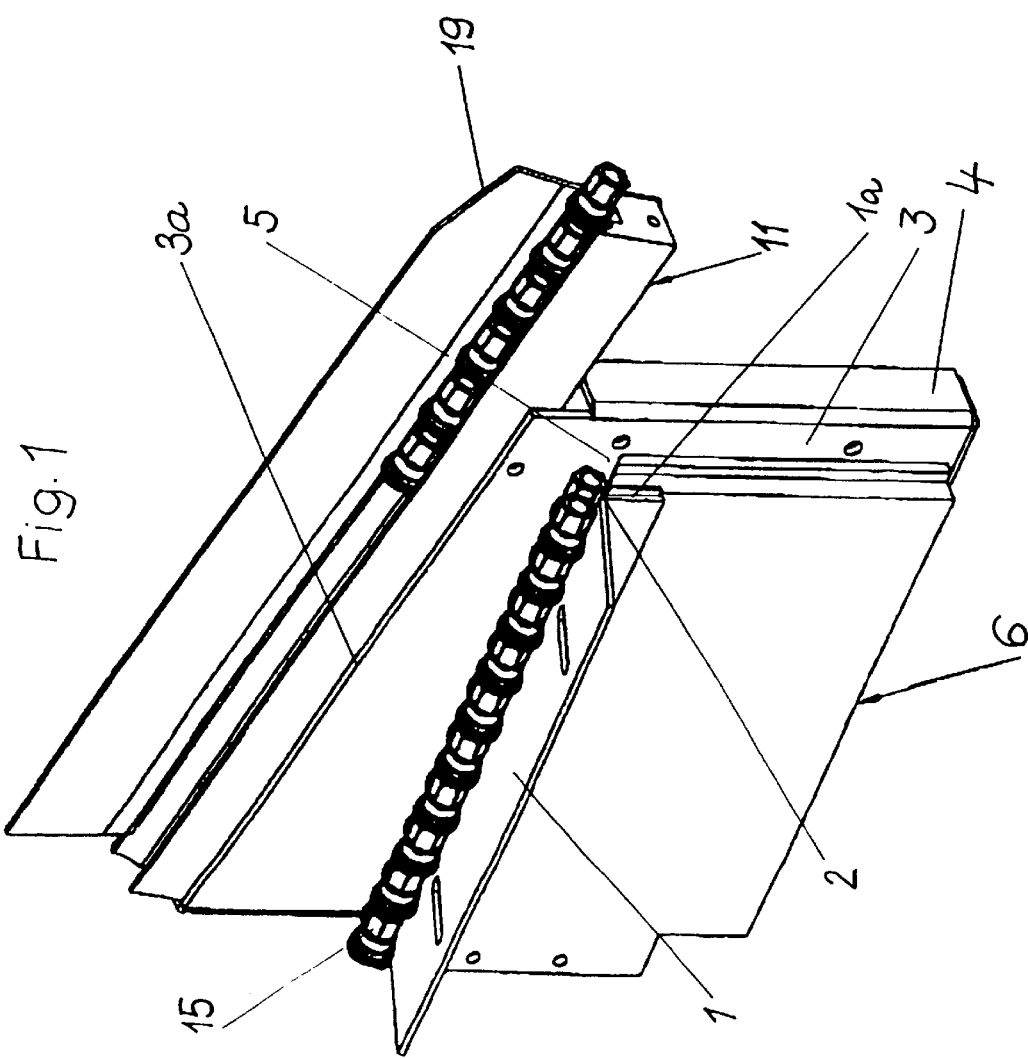

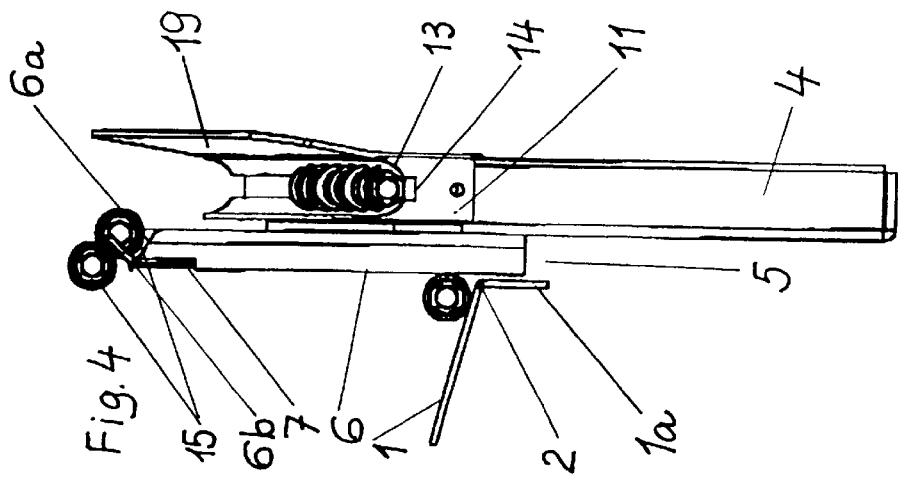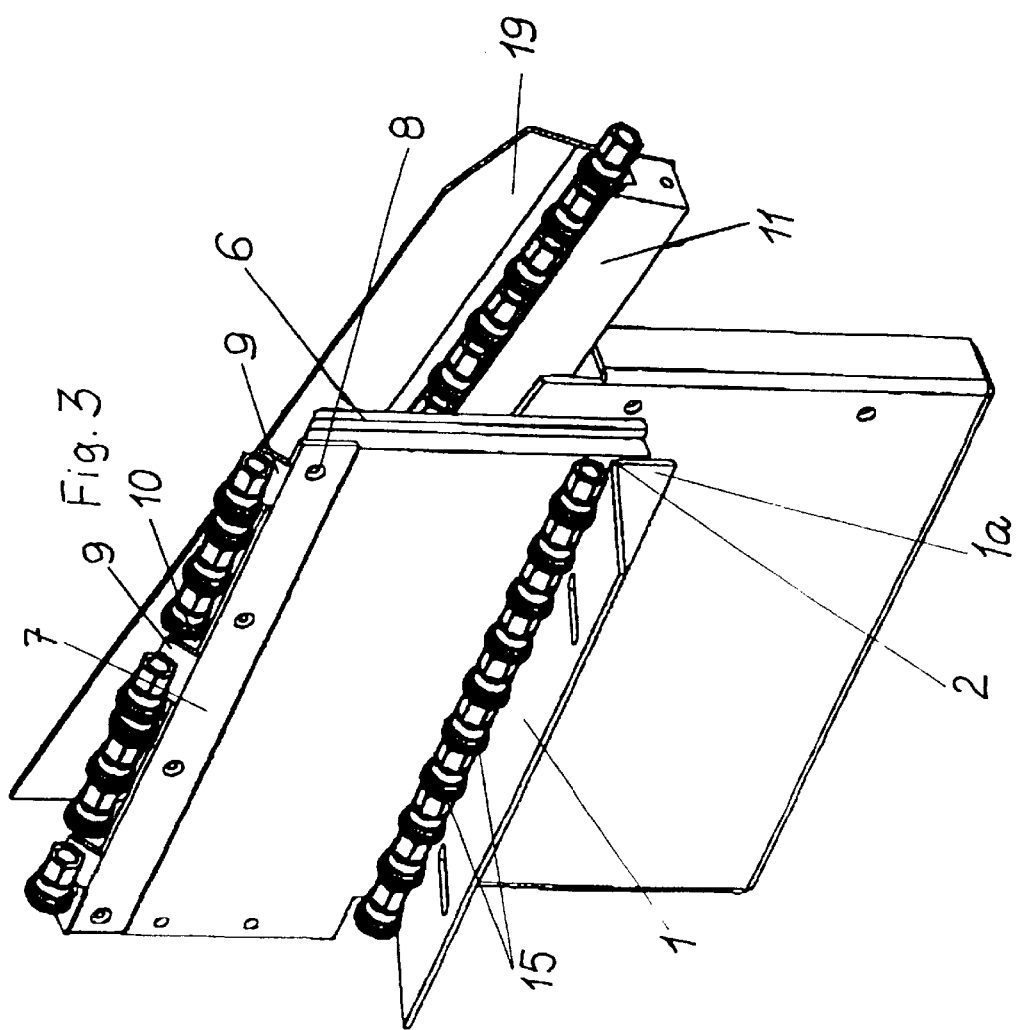

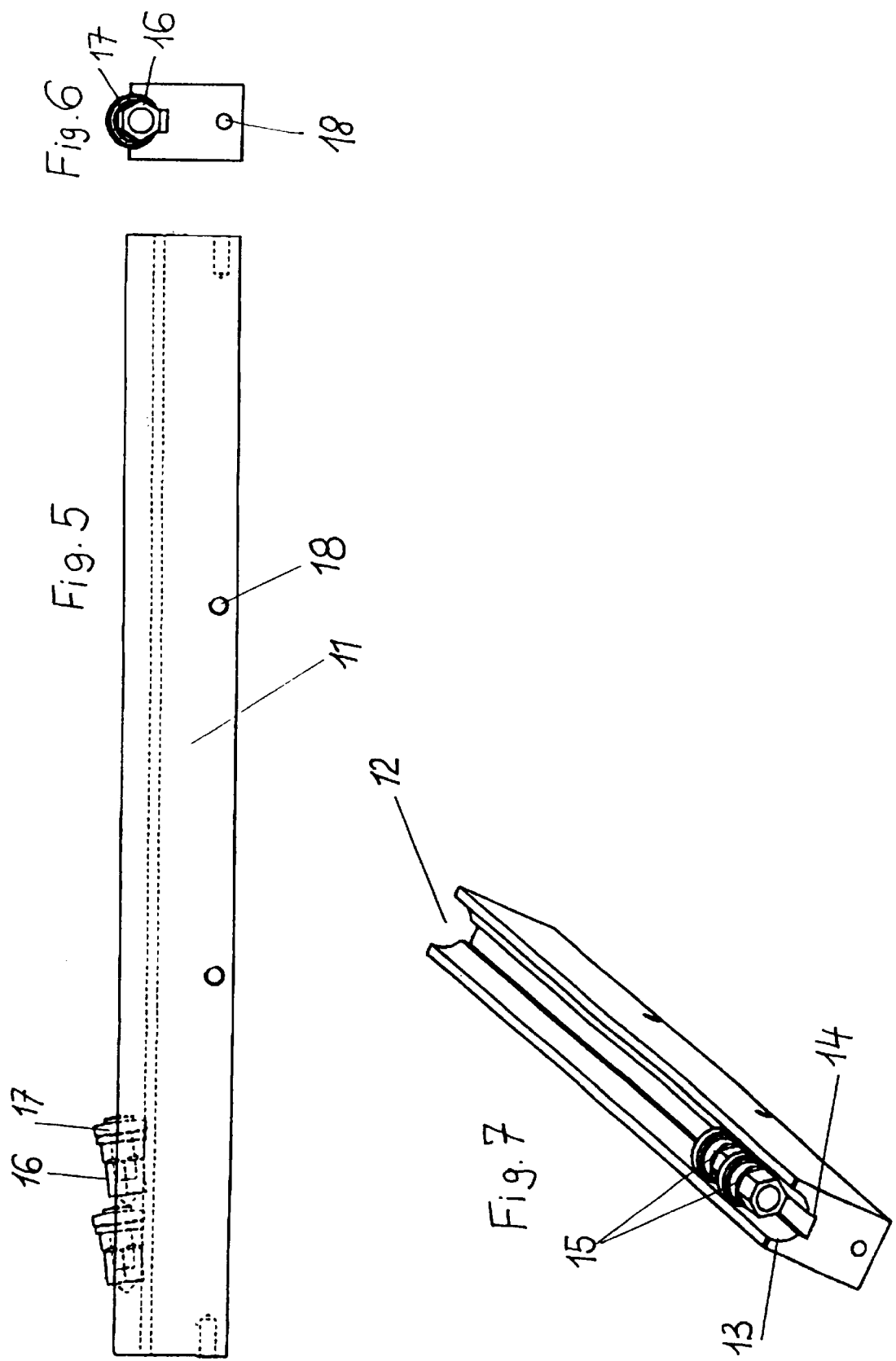

DELIVERY DEVICE FOR SMALL PARTS AND TRANSPORTATION CHANNEL

BACKGROUND OF THE INVENTION

The invention relates to a delivery device, by which small parts in the nature of studs, bushes and pins are delivered to a transportation channel from a sloping collection area, with a retaining and dividing wall, which stands approximately perpendicular, on one side of which the sloping collection area ends in an aperture at a distance from the retaining and dividing wall and along the other side of which is the transportation channel running at an incline to the horizontal, and with a strut in the form of a plate, also displaceable approximately perpendicularly along the retaining and dividing wall, which in its lower position is located approximately at the height of the end edge of the sloping collection area and in its upper position above the transportation channel, in such a way that small parts coming to rest on the retaining and dividing wall are carried along by the upper narrow side of the strut and are delivered into the transportation channel over the upper edge of the retaining and dividing wall.

A delivery device of this kind is known from operational practice. The small parts such as studs, bushes and pins arrive on the sloping surface from a magazine and come to a halt at the retaining and dividing wall still in a largely random arrangement. The strut travels upwards at regular intervals and takes the small parts located on its upper narrow side with it. The small parts located on the upper narrow side are by this time substantially aligned in their longitudinal direction. Once the upper edge of the strut has gone beyond the height of the retaining and dividing wall, a side infeed conveys the small parts over the upper edge of the retaining and dividing wall into the transportation channel located on the other side. The receiver profile of the transportation channel, i.e. the shape of its cross-section, is often a segment of a circle, the measurement of which approximately corresponds to that of the small parts to be transported. The small parts then slide in a kind of flat channel or trough, wherein the transportation channel vibrates. They are delivered therein to an application site.

In practice it has been found that the known delivery device is not free of defects. For instance, during the lifting movement of the strut individual small parts often fell back on to the sloping collection area in an erratic fashion. Or they were not reliably delivered to the transportation channel at the highest point of the strut. It had also proved desirable to be able to meter the exact number of small parts arriving in the transportation channel from the sloping collection area. This is the way to achieve as even a supply to the transportation channel as possible.

SUMMARY OF THE INVENTION

The object of the invention is therefore to create a delivery device of the kind initially mentioned, by which the small parts can be delivered to the transportation channel from the sloping collection area reliably and in amounts which can be exactly determined.

The delivery device is characterised in that the upper narrow side of the strut slopes diagonally downwards at least partially towards the retaining and dividing wall.

When the upper narrow side of the strut slopes obliquely downwards in the way described, in a lower position of the strut the small parts arrive in a kind of channel of acute-angled cross-section, which is formed by the perpendicular side face of the retaining and dividing wall on the one hand and by the obliquely running upper narrow side of the strut on the other hand. Small parts in the nature of studs, bushes and pins, which usually have a basically rotationally symmetrical shape, thus lodge themselves on the retaining and dividing wall in a substantially orderly fashion and with their axial direction running parallel to the retaining and dividing wall. If the strut is then driven upwards into an upper position, the obliquely designed upper narrow edge prevents the small parts from falling down and they roll with no further ado from the narrow side down into the transportation channel when the upper edge of the retaining and dividing wall has been passed. The delivery device according to the invention therefore works very reliably and it can be expected that the small parts, having reached the oblique upper narrow edge of the strut, will be reliably delivered into the transportation channel. The amount of small parts with which the transportation channel is supplied can therefore be set with great accuracy.

According to a further development of the invention it is provided that upwardly directed projections in the nature of pinnacles and gaps alternate with one another in the longitudinal direction of the upper narrow side of the strut. Preferably the slope directed obliquely downwards towards the retaining and dividing wall is only present in the gaps.

Thus, according to this further development not the whole upper narrow side of the strut is utilised to transport the small parts. In other words, the upwardly directed projections of the strut are not used for transporting the small parts. The number of small parts which are to arrive in the transportation channel can thus be varied.

A further improvement can occur if the projections slope obliquely upwards towards the retaining and dividing wall. In this way it is achieved that those small parts which are not to be taken along arrive back promptly and carefully on the sloping collection area and that the small parts are prevented from being left behind and falling down.

In order to make the best possible use of the transportation length of the strut, according to a further advantageous development the longitudinal extension of the gaps is to be a multiple of the longitudinal extension of the projections. Concretely it is preferable if the longitudinal extension of the gaps is three to five times the longitudinal extension of the projections.

To accommodate different types of small parts or to adapt to different amounts to be conveyed each time the strut is lifted, the strut could be changed each time. However, according to a further advantageous development it is preferably provided that a metering plate is joined on to the strut, in particular to the upper region of the strut, on which the gaps are left open and the projections are formed by bending upwards. In this case adapting to different types or numbers of small parts can be done by simple changing of the metering plate. The metering plate can, for example, be screwed to the strut for ease of changing.

So that the small parts move as easily and automatically as possible from the sloping collection area on to the upper narrow side of the strut when they come to rest on the retaining and dividing wall in the lower operating position of the strut, it is provided, according to yet another development, that in the lower position of the strut the higher edge of its upper narrow side is located approximately at the height of the adjacent end edge of the sloping collection area. The upper narrow side of the strut therefore becomes a continuation of the sloping collection area and facilitates the transition and the alignment of the small parts.

The invention also relates to a transportation channel in a device for transporting small parts in the nature of studs, bushes, pins and suchlike which are delivered to an application site from a store, the transportation channel having a receiver profile of such a kind that the small parts are conveyed on the transportation channel sliding substantially in the direction of their longitudinal axis. Transportation channels of this kind are known. In combination with the corresponding automatic transportation devices they serve in automatic assembly to deliver a large number of small parts, including, for example, screws, continuously to the assembly site. A known example is the automatic production of motor vehicles. The transportation channel can be sloping or driven by an oscillating conveyor. The receiver profile in the transportation direction, i.e. its cross-section, is often a segment of a circle, the measurement of which approximately corresponds to that of the small part to be transported. The small parts then slide in a kind of flat channel or trough.

The known transportation channels work reliably when the small parts to be conveyed have approximately the same cross-sectional shape and measurement over their whole length. Accordingly, the conveying of bushes with hexagonal or circular cross-section is particularly favourable. If, on the other hand, studs are to be conveyed which have portions of very varying diameter, these can no longer slide smoothly in the transportation channel. They then jump around and no longer slide smoothly in the transportation channel. To guarantee troublefree operation it is necessary to build in baffles for sorting the pins into the right position.

The difficulties mentioned arise, for example, with so-called earthing studs, with which earthing cables are fastened, for example, on the bodywork of motor vehicles or electrical appliances. The earthing studs consist of a shaft with a thread portion and a substantially cylindrical head. The thread portion is covered by a cap with a hexagonal outer shape. This cap, which can consist of a plastics material, for example, covers the thread of the earthing stud during lacquering and similar procedures. As the round head of the screw protrudes above the hexagonal cross-section of the covering cap, the result is a particularly uneven movement of the earthing studs on the transportation channel and this can cause unpleasant disturbances in the transportation procedure.

With the invention, in a generic transportation channel it is to be achieved that even small parts with a very varying cross-sectional shape and transverse measurement over their length can be reliably conveyed.

This aim of the invention is achieved in a generic transportation channel in that the transportation channel has a compound receiver profile. A compound receiver profile means that it is not determined only by one single geometric shape and by one single defining measurement, as is the case, for example, with a segment of a circle in the nature of a flat trough. A compound receiver profile can, for example, be formed by two circular arcs of different diameter or by a circular arc in combination with a polygonal contour.

With a development of the transportation channel of this kind the longitudinally differing regions of each individual small part are differently supported in the transportation channel. The small part is fixed better in the direction of its longitudinal axis and thereby also centred and is no longer inclined to tumble or jump around. As a result it glides better and baffles to sort the small parts into the right position are no longer needed. In this fashion reliable conveyance even of irregularly contoured small parts is achieved without additional devices, which would be complicated and expensive.

The improvement can in particular be made in that, according to a further development, the cross-section of the receiver profile is composed of at least two basic contours, each of which corresponds to one of several longitudinally differing cross-sectional shapes of the small part to be conveyed. In this way in an individual case particularly reliable guidance of the small part in the transportation channel is possible.

If, for example, screws with a cylindrical screw head are to be conveyed in the transportation channel, the transportation channel according to the invention can be further developed in that the receiver profile of the transportation channel is a segment of a circle starting from its upper side, out of which a segment of a circle of smaller diameter protrudes downwards. The continually conveyed screws then slide with their heads on the segment of a circle of larger diameter starting from the upper side, while the screw shank is guided through the segment of a circle of smaller diameter adjoining underneath. It is soon clear that screws guided in this way are no longer inclined to tumble or jump around, i.e., they avoid transverse movements on the transportation channel.

If, according to yet another development, it is provided that the receiver profile of the transportation channel is a segment of a circle starting from its upper side, out of which a rectangle protrudes at the bottom, the already mentioned earthing studs can therefore be particularly well transported. The cylindrical screw head of the earthing studs, which comprises the largest transverse measurement of this small part, then slides in the part of the receiver profile shaped like a segment of a circle, while the covering cap of the earthing stud, which comprises the smaller transverse measurement, engages with the outer part of a hexagonal side of a rectangular part of the receiver profile. The earthing studs, with their longitudinal axis slightly tilted downwards, are then located exactly in the longitudinal axis of the transportation channel. It is particularly advantageous for this, according to an additional further development, if the diameter of the segment of a circle is marginally larger than the largest diameter of the circular cross-section of the small part and if the width of the rectangle is marginally larger than the width of the polygonal cross-section of the small part. The transportation channel can consist of a longitudinal profile in the nature of a rail, from the upper side of which a longitudinal groove with a cross-section shaped like a segment of a circle starts and continues downwards in a rectangular groove.

The transportation channel can also consist of a flat part bent into a longitudinal profile.

BRIEF DESCRIPTION OF THE ACCOMPANYING DRAWINGS

The invention is hereinafter explained in more detail in an embodiment with reference to FIGS. 1 to 7. The figures show in particular the following:

FIG. 1 is a perspective view of a delivery device according to the invention wherein the strut is located in its lowered position.

FIG. 2 shows the same operating position as FIG. 1 in a front view.

FIG. 3 is a perspective view of the delivery device according to the invention, wherein the strut is located in its upper operating position.

FIG. 4 shows the same operating position as FIG. 3 in a front view.

FIG. 5 represents a transportation channel according to the invention in side view.

FIG. 6 is a front view of the same transportation channel.

FIG. 7 shows the transportation device according to the invention in a perspective view.

DETAILED DESCRIPTION OF THE PREFERRED EMBODIMENT

In FIG. 1 the reference numeral 1 designates a sloping collection area, on which small parts, in this case earthing studs 15, roll downwards and come to rest on the retaining and dividing wall 3. The retaining and dividing wall has a bent part 4 and an upper edge 3a which runs obliquely upwards. The sloping collection area 1 forms with its bent end part 1a an end edge 2, which is located at a distance in front of the retaining and dividing wall 3. Between the end edge 2 of the sloping collection area 1 and the retaining and dividing wall 3 an aperture 5 is thus formed, as can be seen particularly clearly from FIG. 4. In the aperture 5 a strut 6 is perpendicularly displaceable parallel to the retaining and dividing wall 1 (sic). The strut 6 has the shape of a flat plate, the upper narrow side 6a of which slopes obliquely downwards towards the retaining and dividing wall 3. The obliquely downwards directed slope of the upper narrow side 6a of the strut 6 can be seen particularly clearly from FIGS. 2 and 4.

A metering plate 7 is attached in the upper region of the strut 6. It can be changeably fixed to the strut 6, for example, with screws. The fastening holes 8 serve this purpose. The metering plate extends with its lower part in the direction of the strut. Projections 9 are formed upwardly in the metering plate, pointing obliquely upwards. The projections form gaps 10 between each other. In the upper operating position of the strut 6 its upper narrow side 6a protrudes above the upper edge 3a of the retaining and dividing wall located next to it, as is particularly clear from FIGS. 3 and 4.

On the side of the retaining and dividing wall 3 remote from the strut 6 is the transportation channel 11. It runs parallel to the upper edge 3a of the retaining and dividing wall 3 and thus also slopes obliquely. On the side remote from the retaining and dividing wall the transportation channel 11 has an additional guiding face 19. When in the upper operating position of the strut 6 the small parts slide down from its upper narrow side 6a, the guiding face 19 safely effects that all the small parts actually arrive in the transportation channel 11.

The operating method of the delivery device described so far is as follows. The small parts, in the example illustrated the earthing studs 15, slide and roll obliquely downwards on the sloping collection area 1, until they meet the retaining and dividing wall 3. They are then located in a channel formed by the oblique upper narrow side 6a of the strut 6 and the retaining and dividing wall 3; this state is illustrated in FIGS. 1 and 2. The strut 6 travels in stages upwards and takes with it the earthing studs 15 located on its obliquely downwards directed upper narrow side 6a. The upper operating position of the strut is illustrated in FIGS. 3 and 4. The earthing studs 15 slide in this position, in which the upper edge 6b of the strut is located higher than the upper edge 3a of the retaining and dividing wall, obliquely downwards into the transportation channel 11. This operating method is seen particularly well in FIG. 4. The guiding face 19—as already mentioned—prevents the earthing studs from ending up outside, having gone past the transportation channel 11 with particular force.

The metering plate 7 with its obliquely upwards directed projections 9 prevents the whole of the upper narrow side 6a of the strut 6 from being used for transportation purposes. On the contrary transportation takes place only in the gaps 10. Surplus earthing studs 15 are rejected by the projections 9 and roll back on to the sloping collection area. By changing the metering plate 7 it is possible to adapt to different kinds of small parts and the number of small parts to be supplied to the transportation channel can also be determined.

The special configuration of the transportation channel according to the invention can be seen in greater detail from FIGS. 5 to 7. The transportation channel 11 consists of a longitudinal profile in the nature of a rail, from the upper side of which the receiver profile 12 starts. The receiver profile 12 has a compound cross-section. It consists of a segment of a circle 13, which starts from the upper side of the transportation channel 1 and to which a portion 14 in the shape of a rectangle adjoins underneath. In this way a longitudinal groove emerges with a cross-section shaped like a segment of a circle, which a smaller rectangular groove adjoins underneath.

The small parts to be conveyed here are earthing studs 15, which slide in the receiver profile 12 of the transportation channel 11. The earthing studs 15 consist of a screw bolt with a screwed on covering cap. The screw bolt has a cylindrical head 17 which protrudes above the covering cap with its hexagonal cross-section 16 in a radial direction. As can be seen particularly well in FIG. 7, the earthing studs 15 slide in the receiver profile 12 of the transportation channel 11, their cylindrical region 17 being guided in the part of the receiver profile 12 shaped like a segment of a circle, while the region with a hexagonal cross-section 16 locates itself in the rectangular part 14 of the receiver profile 12. In this way the earthing studs are fixed securely in a transverse direction and slide evenly in the longitudinal direction of the transportation direction, with their longitudinal axis slightly tilted downwards, as seen in FIG. 5. The measurements are herein fixed in such a way that the transverse measurements of the receiver profile are marginally larger than the corresponding regions of the earthing stud to be conveyed.

The transportation channel consists of a longitudinal profile in the nature of a rail, which can be produced, for example, by extrusion. The screw holes 18 located on the rail serve to fasten the entire component.

What is claimed is:

1. A delivery device for delivering small parts in the nature of studs, bushes and pins, which comprises:

a retaining and dividing wall (3) extending generally in a vertical direction, and formed with a first side surface and a second side surface opposite the first side surface, and an upper edge (3a) between the first side surface and the second side surface;

a sloping collection area (1) sloping in a first orientation downward toward the first side surface of the retaining and dividing wall (3) and formed with an end edge (2) spaced by a distance from an adjacent portion of the first side surface;

an aperture (5) formed by the spaced distance between the end edge (2) of the sloping collection area (1) and the adjacent portion of the first side surface of the retaining and dividing wall (3);

a transportation channel (11) located adjacent the second side surface of the retaining and dividing wall (3) and inclined to a horizontal plane in a second orientation laterally of the first orientation;

a strut (6) in the form of a plate displaceable in a path adjacent the first side surface of the retaining and dividing wall (3);

the sloping collection area (1) being sloped in the first orientation downward toward the first side of the retaining and dividing wall (3) to facilitate movement of small parts over the sloped collection area (1) to a rest position at the end edge (2) and the aperture (5) and against the adjacent portion of the first side surface;

the strut (6) formed with an upper narrow side (6a) which, in a lower position, is located adjacent the end edge (2) of the sloping collection area (1) and the aperture (5), with the strut being movable through the aperture (5) to move the upper narrow side through and away from the aperture toward and beyond the upper edge (3a) to an upper position of the upper narrow side and above the location of the transportation channel (11); whereby the small parts are carried by the upper narrow side (6a) from the lower position of the upper narrow side to the upper position thereof to deliver the carried small parts over the upper edge (3a) and into the transportation channel (11); and the upper narrow side (6a) of the strut (6) slopes downward at least partially towards the retaining and dividing wall (3).

2. The delivery device according to claim 1, which further comprises:

a plurality of projections (9) directed upwards in a longitudinal direction of the upper narrow side (6a) of the strut (6) alternate with one another in the nature of pinnacles and gaps (10).

3. The delivery device according to claim 2, which further comprises:

the slope of the narrow side (6a) directed obliquely downwards towards the retaining and dividing wall (3) is present only in the gaps (10).

4. The delivery device according to claim 3, which further comprises:

the plurality of projections (9) slope obliquely upwards towards the retaining and dividing wall (3).

5. The delivery device according to claim 4, which further comprises:

a longitudinal extension of the gaps (10) is a multiple of a longitudinal extension of the plurality of projections (9).

6. The delivery device according to claim 5, which further comprises:

the longitudinal extension of the gaps (10) is three to five times the longitudinal extension of the plurality of projections (9).

7. The delivery device according to claim 6, which further comprises:

a metering plate (7) is attached to the strut (6), on which the gaps (10) and the plurality of projections (9) are formed.

8. The delivery device according to claim 7, which further comprises:

in the lower position of the strut (6), a higher edge (6b) of the upper narrow side (6a) of the strut is approximately at the height of the adjacent edge (2) of the sloping collection area (1).

9. The transportation channel (11) according to claim, which further comprises:

a receiver profile (12) of such a kind that the small parts are conveyed by sliding substantially in the direction of their longitudinal axis, and the receiver profile (12) having a compound cross section (13,14).

10. The transportation channel according to claim 9, which further comprises:

the receiver profile (12) includes at least two basic contours, each of which corresponds to one of several longitudinally differing cross-sectional shapes of the small part to be conveyed.

11. The transportation channel according to claim 10 for transporting small parts with a shank and a cylindrical head, the head having a larger cross-section than the shank, which further comprises:

the cross-section of the receiver profile (12) is formed from a segment of a circle (13) starting from an upper side thereof, out of which a segment of a circle of smaller diameter projects downwards.

12. The transportation channel according to claim 10 for transporting small parts, which includes small parts having at least one circular cross-section and follows a polygonal cross-section longitudinally and protrudes above it, which further comprises:

the receiver profile (12) is formed from a segment of a circle (13) starting from an upper side thereof, out of which a rectangular portion (14) projects downwards.

13. The transportation channel according to claim 12, which further comprises:

the diameter of the segment of the circle (13) is larger than the largest diameter of the circular cross-section (17) of the small part (15) and the width of the rectangular portion (14) is larger than the width of the polygonal cross-section (16) of the small part (15).

14. The transportation channel according to claim 13, which further comprises:

the channel being formed in a longitudinal profile in the nature of a rail;

the upper side of the channel being formed with a longitudinal groove with a cross-section shaped like a segment of a circle; and a rectangular groove formed in the channel, with the segment of the circle starting from the upper side of the channel and continuing downwards in the rectangular groove.

15. The transportation channel according to claim 13, which further comprises:

a flat part bent into a longitudinal profile.

16. A transportation channel (11) for transporting small parts in the nature of studs, bushes, pins and the like, which comprises:

a receiver profile (12) of such a kind that the small parts are conveyed by sliding substantially in the direction of their longitudinal axis, and the receiver profile (12) having a compound cross section (13,14). the receiver profile (12) having a compound cross-section (13,14).

17. The transportation channel according to claim 16, which further comprises:

the receiver profile (12) includes at least two basic contours, each of which corresponds to one of several longitudinally differing cross-sectional shapes of the small part to be conveyed.

18. The transportation channel according to claim 17 for transporting small parts with a shank and a cylindrical head, the head having a larger cross-section than the shank, which further comprises:

the cross-section of the receiver profile (12) is formed from a segment of a circle (13) starting from an upper side thereof, out of which a segment of a circle of smaller diameter projects downwards.

19. The transportation channel according to claim 17 for transporting small parts, which includes small parts having at least one circular cross-section and follows a polygonal cross-section longitudinally and protrudes above it, which further comprises:

the receiver profile (12) is formed from a segment of a circle (13) starting from an upper side thereof, out of which a rectangular portion (14) projects downwards.

20. The transportation channel according to claim 19, which further comprises:

the diameter of the segment of the circle (13) is larger than the largest diameter of the circular cross-section (17) of the small part (15) and the width of the rectangular portion (14) is larger than the width of the polygonal cross-section (16) of the small part (15).

21. The transportation channel according to claim 20, which further comprises:

the channel being formed in a longitudinal profile in the nature of a rail;

the upper side of the channel being formed with a longitudinal groove with a cross-section shaped like a segment of a circle; and a rectangular groove formed in the channel, with the segment of the circle starting from the upper side of the channel and continuing downwards in the rectangular groove.

22. The transportation channel according to claim 20, which further comprises:

a flat part bent into a longitudinal profile.

* * * * *